United States Patent [19]

Rosen

[11] 4,418,350

[45] Nov. 29, 1983

[54] TWO-AXIS ANTENNA DIRECTION CONTROL SYSTEM

[75] Inventor: Harold A. Rosen, Santa Monica, Calif.

[73] Assignee: Hughes Aircraft Company, El Segundo, Calif.

[21] Appl. No.: 246,793

[22] Filed: Mar. 23, 1981

[51] Int. Cl.[3] .............................................. H04B 7/00

[52] U.S. Cl. .................................... 343/359; 343/352; 343/432

[58] Field of Search ................ 343/100 ST, 100 AD, 343/119, 16 M, 117 R

[56] References Cited

U.S. PATENT DOCUMENTS 3,480,960 11/1969 Zulch et al. ......................... 343/119

*Primary Examiner*—Theodore M. Blum

*Attorney, Agent, or Firm*—E. F. Oberheim; A. W. Karambelas

[57] ABSTRACT

An antenna pointing control system primarily useful for aiming and controlling a communications satellite directional antenna. The invention makes use of a ground based pilot station which transmits an up-link signal to the satellite, including frequency differentiated communication signals and command and control signals. The command and control signals are referred to as the beacon or pilot signal. The pilot signal is a triangular frequency modulation waveform. The communications signals and the pilot signal are received by a common directional antenna on the satellite. A microwave network coupled to a multiple feed horn assembly of the antenna and responsive to the pilot signal produces pilot signal components including a sum signal and east-west and north-south error signals indicative of the corresponding angular errors between the desired antenna pointing direction and the direction from the satellite to the pilot station. Subsequent processing of the pilot signal components in a command and control receiver yields both command information and steering signals, the latter for controlling the antenna pointing direction with respect to the pilot station.

6 Claims, 9 Drawing Figures

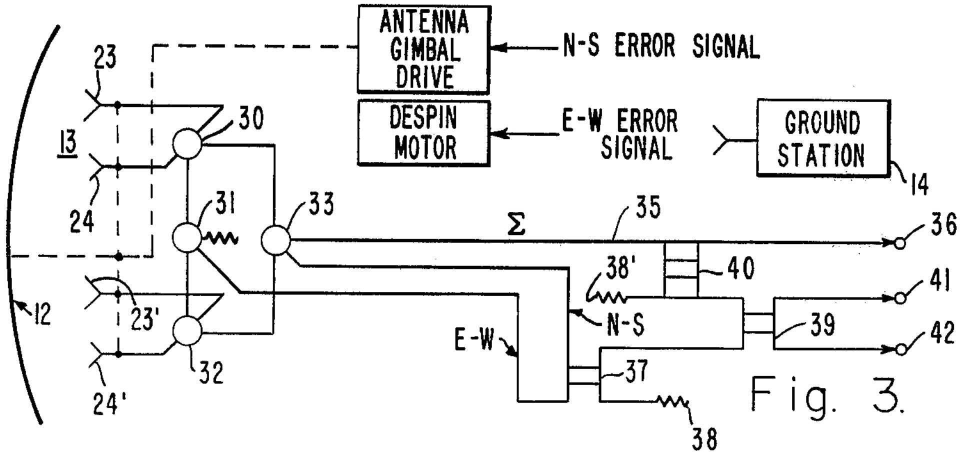
Fig. 3.
Fig. 5.
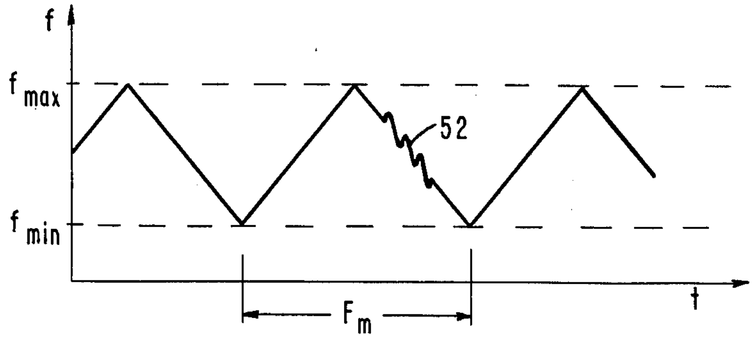
Fig. 6.
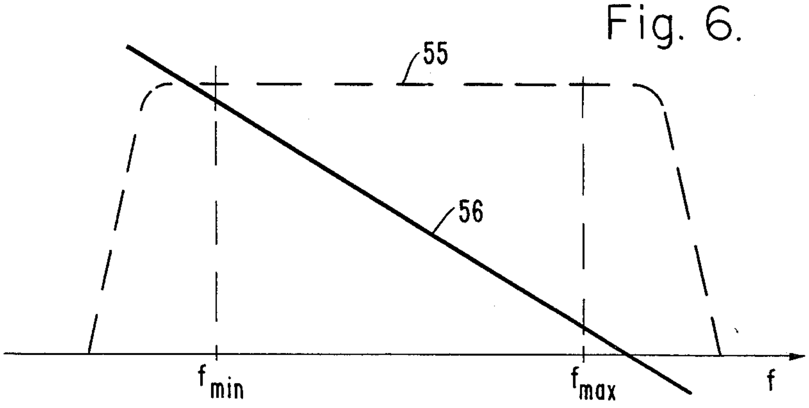

TWO-AXIS ANTENNA DIRECTION CONTROL SYSTEM

BACKGROUND OF THE INVENTION

1. Field of the Invention

This invention relates to antenna control systems and, more particularly, to antenna control systems for pointing and controlling the directional antennas of communications satellites.

2. Description of the Prior Art

To obtain optimum communication coverage over an area being served by a communications satellite, precise directional satellite antenna control is necessary. The complexity of antenna control systems depends upon many factors, including the type of satellite, the type and extent of communication coverage, the satellite orbit, and so on. Notwithstanding the many differences in satellite types and missions, it is necessary to orient and direct the antennas so that their transmit/receive beams coincide with the desired coverage on earth.

Antenna direction control becomes increasingly complex as improved aiming accuracy and longer satellite lifetimes are sought. In one prior art antenna control system for spin-stabilized satellites, redundant earth sensors and sun sensors provide the basic sensing elements, and a processor derives the steering signals for a de-spin motor to control the antenna pointing. Such systems have several drawbacks including cost, complexity and weight. In addition, pointing errors associated with sensor noise and thermal deformation, for example, are present in such systems.

An improved antenna control system is described in U.S. Pat. No. 3,757,336 which issued to the present inventor on Sept. 4, 1973. In that patent, the communications satellite antenna control is provided by means of a pilot signal transmitted from an earth station. This earth station transmits a modulated beacon or pilot signal to the satellite where it is received, processes, decoded and utilized to control the de-spin motor in the satellite for tracking and offset.

As narrower antenna beams are used in communication satellite service as a consequence of the higher frequencies employed, much more precise antenna beam pointing accuracies are required. With these narrower antenna beams it is becoming increasingly necessary to provide both east-west and north-south beam pointing with high accuracies.

It is, therefore, an object of the present invention to provide a low-cost, two-axis satellite antenna pointing and control system.

Another object of the invention is the provision of a satellite antenna pointing and control system which permits very precise beam pointing to be achieved in a simple manner.

Another object of the present invention is to provide a satellite antenna pointing and control system which eliminates potential sources of satellite failure by locating system complexities at the ground station instead of on board the satellite.

Still another object of the invention is the provision of a satellite antenna pointing and control system which makes use of apparatus which must be provided on the satellite anyway for other purposes.

Yet another object of the present invention is to provide a satellite antenna pointing and control system which operates with low noise as well as low calibration errors.

A further object of the invention is the provision of a satellite antenna pointing and control system which permits the ground transmitter to have a low spectral power density.

SUMMARY OF THE INVENTION

To provide improvement over sun-earth sensor systems and other prior art antenna control systems, the present invention utilizes a system in which a substantial portion of the complex system components and circuitry are disposed on the ground at a pilot earth terminal rather than in the satellite. A pilot or beacon signal is transmitted to the satellite from the pilot station—preferably in the same frequency band employed for the communications uplink. An efficient waveform for the pilot signal is a triangular frequency modulation, with a large deviation and a low repetition frequency. In a preferred embodiment, the pilot signal comprises a recurring, linearly frequency modulated carrier, which is depicted as a triangular waveform, upon which the offset and command information can be superimposed. The pilot or beacon signal is linearly frequency modulated at an audio rate and has a peak-to-peak frequency deviation on the order of several megahertz.

On the satellite, four antenna feed horns are symmetrically disposed in a square or rectangular group in the reflector focal plane and clustered about a point in the radiant energy path between the horns, the antenna reflector and the pilot station when the antenna reflector is properly aimed. Other feed horns are also disposed in the reflector focal plane so as to provide the desired communication receive and transmit beam coverage. The pilot signal feed horns are connected by means of biconjugate hybrid networks to provide three output signals representing, respectively, the sum of the antenna feed horn signals and the two orthogonal feed horn difference signal patterns in the manner of a two-dimensional monopulse antenna. The difference signal patterns are combined in phase quadrature relationship.

The sum signal is passed through a directional tracking filter which exhibits a linear 360° differential phase shift over the pilot signal frequency modulation range. The sum signal thus undergoes periodic phase reversals at the output of the tracking filter. When this phase shifted sum signal is combined with the combined orthogonal difference signals, the difference signals are thereby amplitude modulated in synchronism with the frequency modulation to thereby produce an antenna pointing error signal having amplitude and frequency modulated components. Subsequent processing of the antenna pointing error signal in the satellite command receiver provides two dc error signals representative respectively of the east-west and north-south pointing errors. These dc error signals are then used to drive the antenna pointing apparatus. Antenna pointing offsets may also be provided by ground command.

BRIEF DESCRIPTION OF THE DRAWINGS

The foregoing and other features and objects of the present invention will become more apparent by reference to the following detailed description, taken in conjunction with the accompanying drawings, wherein like reference numerals denote like elements, and in which:

FIG. 3 is a schematic representation of the antenna signal combining network employed in an exemplary embodiment of the present invention;

FIG. 5 is a graphical illustration of a representative command and control signal with frequency plotted as a function of time;

FIG. 6 is a graphical illustration of the signal transmission characteristics of the tracking filter included in the antenna signal combining network of FIG. 3;

DETAILED DESCRIPTION OF THE INVENTION

Figure 1:
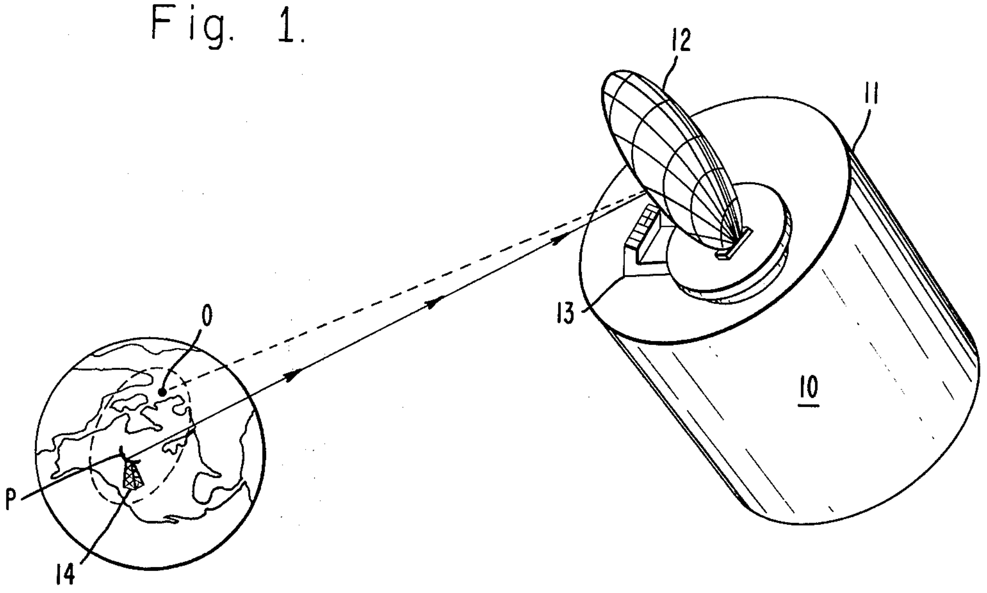
FIG. 1 is a pictorial illustration of a satellite in a geostationary orbit above a geographic area in which is located a pilot station.

Referring more specifically to the drawings which illustrate a presently preferred embodiment of the invention, FIG. 1 is a pictorial representation of a satellite 10 in geostationary orbit with respect to the earth, providing communications to and from stations located within a predetermined geographic area on earth. The satellite 10 comprises a generally cylindrical spin stabilized body 11 upon which is mounted a despun section or assembly comprising an antenna reflector 12 and antenna feed horns 13. The reference axis of the antenna reflector 12 is indicated by the dashed line which extends to a point 0 on earth. The contour of the antenna radiation pattern is approximately depicted by a generally elliptical area which includes point 0 as well as a pilot station 14 located at point P. For simplicity, directional coordinates N-S and E-W have been omitted from FIG. 1, but it is to be understood that they coincide with Cartesian coordinates on earth; however, other coordinate systems including locations other than the earth may be employed in practicing the present invention.

As may be seen from FIG. 1, the pilot station 14 is disposed within the usable EIRP (effective isotropic radiated power) contour of the antenna of the satellite 10, but in general is located off the antenna reference axis. In other words, the reference axis of the antenna radiation pattern does not necessarily correspond to the position P of the pilot station 14. This means that there may be both a longitudinal offset as well as a latitudinal offset between the two points 0 and P on earth.

In FIG. 1 the directional antenna assembly includes a parabolic reflector 12 which is illuminated by the array of antenna feed horns 13 arranged in a predetermined manner in the focal plane of the reflector 12. As is well known in the art, the positioning and relative phasing of the wave energy applied to the array of feed horns 13 provides the antenna beam coverage desired. Both the antenna feed horns 13 and the parabolic reflector 12 are mounted on a de-spun (earth pointing) section of the satellite. A suitable de-spin motor (not shown) mounted in the satellite 10 and mechanically connected between the spinning and the de-spun sections provides for the de-spinning of the antenna reflector 12, the feed horns 13, and other de-spun elements of the satellite including the command and control receiver.

Although only one satellite antenna is shown in the simplified pictorial view of FIG. 1, it is to be understood that a number of antennas may be employed. For the purpose of the present invention, only one antenna and feed horn arrangement is necessary, and although other antennas would be used, their functions can be considered ancillary to the antenna control function of the invention.

In accordance with the invention, de-spinning of the de-spun section is controlled so that the directional antenna is pointed in a fixed direction with respect to the direction of the pilot station 14. As previously mentioned, the antenna beam axis may be offset from the location P of the pilot station 14 by a predetermined amount.

Figure 2:
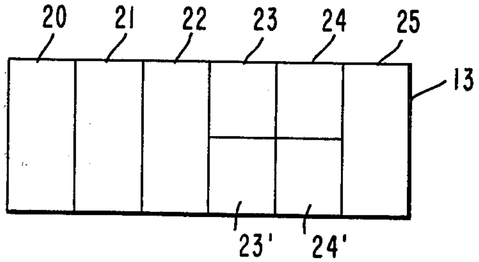
FIG. 2 is a plan view of a portion of the satellite antenna feed horn assembly employed in the present invention.

In FIG. 2 there is shown a plan view of the antenna feed horns 13 showing them in more detail. It is to be understood, of course, that the square or rectangular feed horn grouping depicted in FIGS. 1 and 2 is for the sake of illustration only, and does not necessarily represent the feed horn arrangement for any particular geographic coverage. In FIG. 2, the antenna feed horns 13 are shown as a plurality of individual rectangular waveguide sections 20 through 25 separated by vertically extending septa. Two of the rectangular waveguide sections 23 and 24 are further divided by means of horizontal septa thereby forming a symmetrical square or rectangular arrangement of four waveguide sections 23, 23', 24, 24' for the purpose to be discussed in greater detail hereinbelow. The common intersection of the four waveguide sections 23, 23', 24, 24' thus formed is disposed so that it coincides with the predetermined spot in the focal plane of the reflector 12 which corresponds closely to the image position of the pilot station 14.

In practice, the plurality of waveguide sections 20–25 which comprise the antenna feed are fed with signals of the proper magnitude and phase to achieve the desired coverage on earth. In general, the relative phasing of these waveguide sections 20–25 can be accomplished, as is known in the art, by means of a feed manifold structure, not shown. To achieve the purpose of the present invention, additional feed network means are required. Such means are shown in the schematic diagram of FIG. 3.

In the schematic diagram of FIG. 3, the four waveguide sections 23, 23', 24 and 24' that comprise the pilot beam antenna feed are interconnected by a microwave network comprising the biconjugate hybrid junctions 30, 31, 32 and 33. The waveguide sections 23 and 24 are connected to the so-called "sidearms" of the hybrid junction 30, whereas the waveguide section 23' and 24' are connected to the sidearms of the hybrid junction 32. The sum arms of the hybrid junctions 30 and 32 are, in turn, connected to the sidearms of the hybrid junction 33, and the difference arms of the hybrid junctions 30 and 32 are connected to the sidearms of the hybrid junction 31. The sum arm of the hybrid junction 33 is connected by an appropriate transmission line 35 to an output port 36, and the difference arm of the hybrid junction 31 is terminated by a matched load impedance.

The difference arm of the hybrid junction 33 and the sum arm of the hybrid junction 31 are connected to the respective input ports of a first phase quadrature hybrid junction network 37. One output arm of the phase quadrature hybrid junction network 37 is terminated by a matched load impedance 38, and the second output arm thereof is coupled to one input arm of a second phase quadrature hybrid junction network 39. Between transmission line 35 and the second input port of the phase quadrature hybrid junction network 39 there is connected a directional tracking filter 40 having characteristics to be discussed hereinbelow. A second matched load impedance 38' is coupled to the remaining port of the directional filter 40. The outputs of the second phase quadrature hybrid junction network 39 comprise the output ports 41 and 42.

Figure 4:
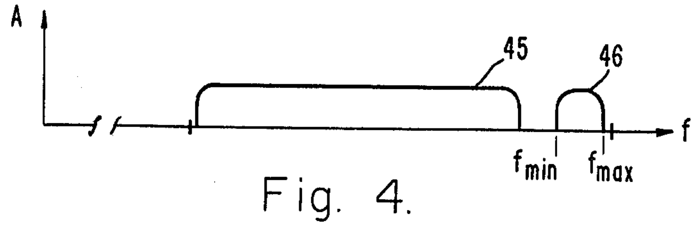
FIG. 4 is a graphical illustration of the frequency spectrum of the up-link signal transmission to the satellite from the earth terminal or pilot station depicting the communications and the command and control portions of the signal spectrum.

In describing the operation of the network of FIG. 3, reference is also made to the graphs presented in FIGS. 4, 5 and 6, which will be introduced as required. The uplink composite signal wave energy from the pilot station 14, in a typical case, has a frequency spectrum as shown in FIG. 4. A first portion of the spectrum, indicated generally by an envelope 45, is occupied by the various communications signals, usually further broken up into a plurality of channels often occupied, in turn, by a number of information carrying subcarriers. The whole of the envelope 45 can be conveniently regarded as the communications uplink band.

A second and much smaller band of frequencies extending from $f_{min}$ to $f_{max}$ is indicated in FIG. 4 by an envelope 46. It is this band of frequencies which contains the antenna control and satellite command signals of interest. It is to be understood, of course, that the uplink signals depicted in FIG. 4 are merely exemplary and are not to be deemed as limiting the scope of the present invention. The control and command band, and the communications band can be rearranged so that they occupy other portions of the spectrum, for example. Also, the fact that an uplink communications band is shown does not imply that all uplink signals emanate from the pilot station.

The uplink signals are intercepted at the satellite by the antenna reflector 12 and focussed onto the quadrature set of receiving feedhorns 23, 24, 23' and 24'. The signals intercepted by the feedhorns are combined in the network of hybrid junctions 30, 31, 32 and 33 to produce three signals labeled Σ, N-S and E-W. The signal Σ is obtained from the sum arm of the biconjugate hybrid network 33. This signal contains communications signals, which are coupled out of the circuit to the communications manifold, not shown, by means of an output port 36. The sum signal Σ also provides a phase reference for extracting the antenna pointing error.

The difference arm of the hybrid network 33 supplies the north-south (N-S) error signal component. This error signal represents the magnitude of the angle by which the arriving signal deviates from the north-south plane of the antenna reflector axis. The sum arm of the hybrid network 31 similarly provides the east-west (E-W) error signal which provides a measure of the angle by which the arriving signal deviates from the east-west pointing direction of the satellite antenna reflector axis. The N-S and E-W error signals are combined in phase quadrature in a phase quadrature hybrid network 37.

The command and control signal, with frequency plotted as a function of time is shown in the graph of FIG. 5. As seen in FIG. 5, the signal is linearly modulated in frequency between the limits $f_{min}$ to $f_{max}$ at a predetermined recurring rate. As previously mentioned, other modulating waveforms can be utilized, as desired, with appropriate receiver modifications. Superimposed upon the triangular waveform is a frequency modulated command tone 52. Command tones are sent along with the control signal and are demodulated in the command and control receiver to provide the usual satellite commands.

The sum signal is transmitted through a directional tracking filter 40 and combined with the error signals in a quadrature hybrid network 39. The transmission characteristics of the tracking filter 40 are shown in the graph of FIG. 6. The amplitude response characteristic of the directional tracking filter 40 for transmission between the hybrid network 33 and the quadrature hybrid network 39 is depicted by a dashed line 55. As shown by dashed line 55, the directional tracking filter 40 is characterized by a flat amplitude response in the passband between the frequency limits $f_{min}$ and $f_{max}$. The phase shift between the same two frequency limits is depicted by a solid straight line 56. If the phase shift at $f_{min}$ is arbitrarily designated $\Psi_o$ then the phase shift at $f_{max}$ corresponds to $\Psi_o+360°$. In other words, tracking filter 40 is characterized by a flat amplitude response and a linear phase response over the band of the pilot signal with a relative phase difference of 360 degrees between the frequency limits $f_{min}$ and $f_{max}$. The sum signal Σ after passing through the tracking filter 40 is combined with the E-W and N-S error signals in the quadrature hybrid network 39.

Figure 9:
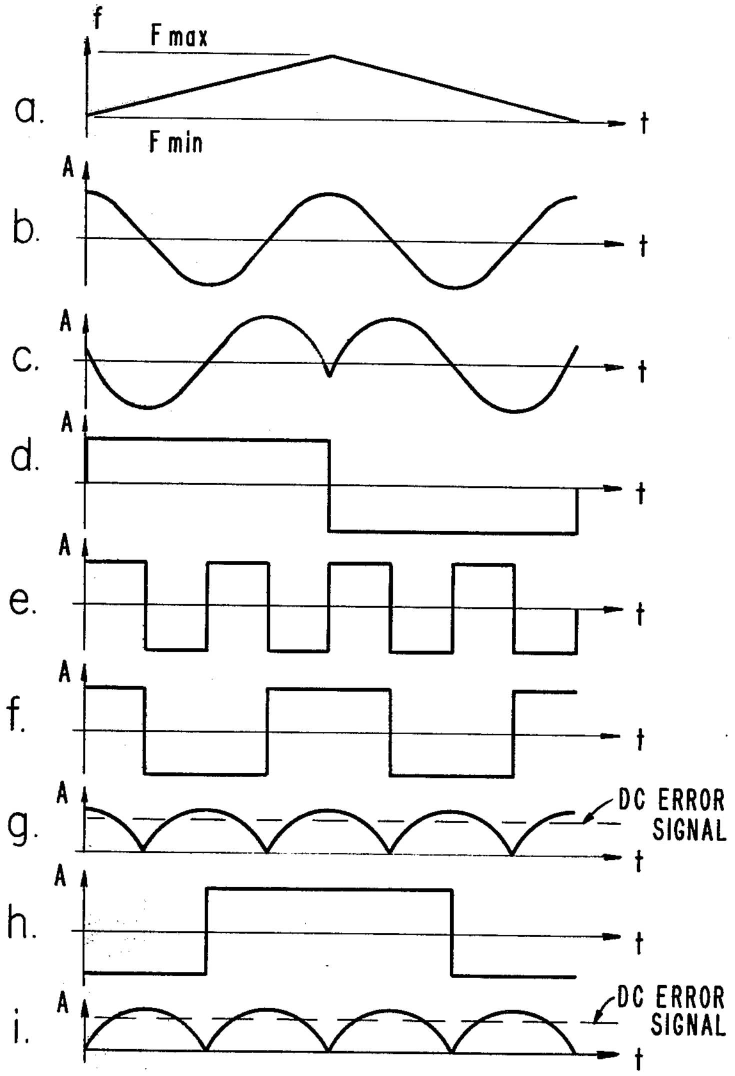
FIG. 9 depicts the operating signal waveforms at selected points in the receiver of FIG. 8.
Figure 7:
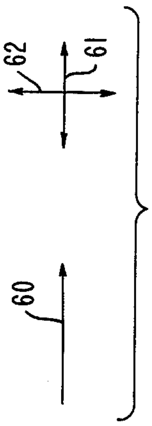
FIG. 7 is a vector diagram illustrating an instantaneous phase relationship of the sum signal and the combined east-west and north-south difference signals.

Although the error signal waveforms are shown in more detail in FIG. 9, the relative instantaneous phases of these signals at the quadrature hybrid network 39 are shown in the vector system of FIG. 7. The left arrow or vector 60 represents an instantaneous phase position of the sum signal Σ at the low frequency extreme $f_{min}$ of the pilot signal. The vectors 61 and 62 represent the relative phases of the E-W and E-S error signals, respectively. As the frequency of the pilot signal is swept over the band as shown in FIG. 5, the vector 60 rotates with respect to the vectors 61 and 62 adding to and subtracting from them at the modulation rate.

The combined signal is therefore amplitude modulated with the amplitude modulation envelope containing the combined east-west and north-south directional information. The combined signal is extracted from the phase quadrature hybrid network 39 by means of the outputs 41 and 42. These outputs 41, 42 are fed through an appropriate transmission line, to redundant command and control receivers, one of which is shown in FIG. 8.

In the command and control receiver, the composite or combined signal is processed in a manner which extracts the amplitude and frequency modulated components. The frequency modulation component provides a timing reference at the modulation rate $F_M$, and at the same time provides the demodulated command tones for the command portion of the receiver. The amplitude modulation component, after processing provides the E-W and N-S error signals for antenna control.

Figure 8:
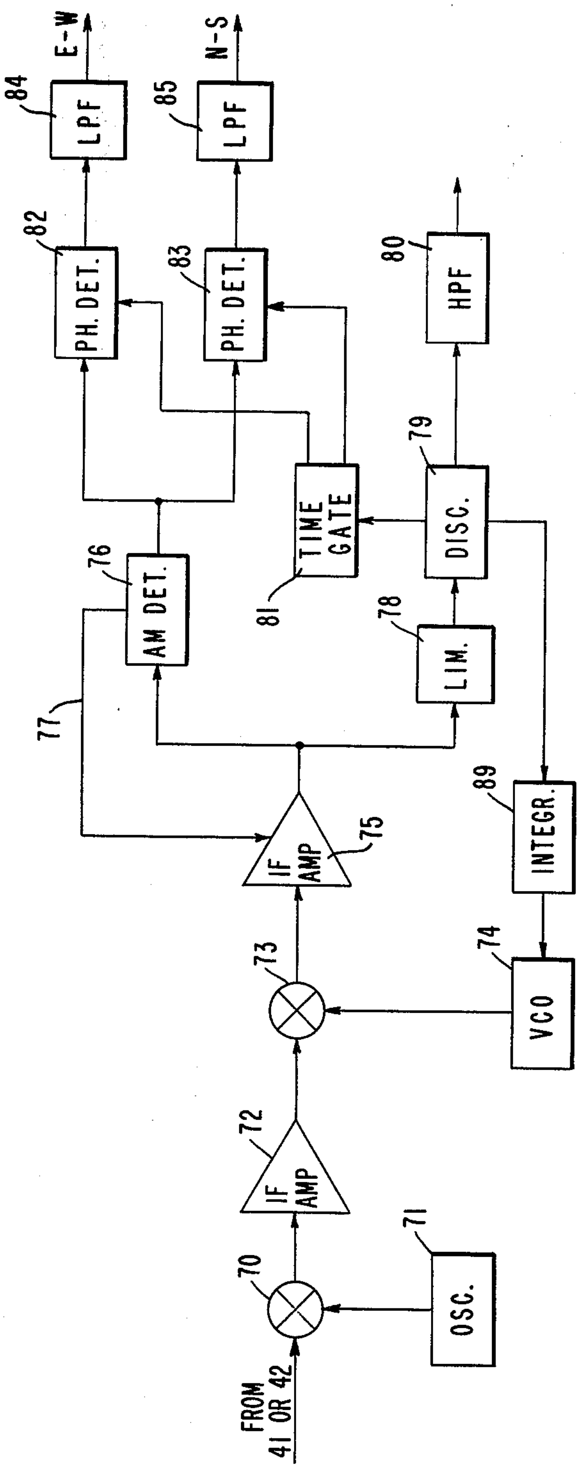
FIG. 8 is a block diagram of the command and control system receiver of the present invention.

In FIG. 8, there is shown a block diagram of a preferred embodiment of a command and control receiver in accordance with the present invention. Referring more specifically to that figure, the input signal derived from one of the outputs 41 or 42 of the quadrature hybrid network 39 is applied to a first mixer 70. Also coupled to the mixer 70 is a first local oscillator 71. The output of the mixer 70 is coupled to the input of a first intermediate frequency (i.f.) amplifier 72. The output of the i.f. amplifier 72 is coupled to a second mixer 73 as is the output from a voltage controlled oscillator 74. The output of the mixer 73 is in turn coupled to the input of a second i.f. amplifier 75, which has an additional control input port for automatic gain control purposes.

The output of the second i.f. amplifier 75 is coupled to an AM envelope detector 76 one output of which is fed back as an automatic gain control (AGC) signal via an AGC path 77 to the control input of the i.f. amplifier 75. The output of the amplifier 75 is also coupled through an amplitude limiter 78 to an FM discriminator 79. The discriminator 79 detects any frequency modulated command tones which are superimposed on the basic tracking modulation waveform, as shown in FIG. 5. The command tones are coupled to command tone detectors, not shown, through a high-pass filter 80.

The discriminator 79 has a control output circuit coupled through an integrator 89 to the control input terminal of the voltage controlled oscillator 74 to complete an automatic frequency control loop. The discriminator 79 has a further output circuit coupled to a time gate generator network 81. The two outputs of the time gate generator network 81 are connected, respectively, to a first phase detector 82 and a second phase detector 83. The output of the envelope detector 76 is also coupled as inputs to the phase detectors 82 and 83. The gated output of the phase detector 82 is in turn coupled to a low pass filter 84 to provide an E-W error signal output. The gated output of the phase detection 83 is similarly coupled through a low pass filter 85 to provide the N-S error signal output from the receiver.

In order that the operation of the receiver of FIG. 8 be more readily understood, it will be explained with reference to the signal waveforms shown in the graphical representation of FIG. 9. The signal waveforms of FIG. 9 are all drawn to a common time reference as indicated by the abscissa scale in FIG. 9(*i*). With the exception of FIG. 9(*a*) which is a plot of frequency versus time, all of the other waveforms (*b* through *i*) are plots of amplitude versus time.

The triangular waveform shown at FIG. 9(*a*) depicts the frequency modulation versus time of the beacon or pilot signal. The frequency of the triangular wave varies linearly from $f_{min}$ to $f_{max}$ and back as shown in FIG. 6 at a frequency modulation rate of $F_M$. The waveform depicted at FIG. 9(*b*) comprises the E-W error AM signal envelope, and the waveform of FIG. 9(*c*) is the N-S error AM signal envelope.

The time gate generator 81, which is driven by the FM discriminator 79, includes a differentiator (not shown), a phase locked oscillator (not shown) and a count down timing chain (not shown), all of which are conventional, used for deriving the gate pulses shown by the waveforms of FIG. 9(*d*), 9(*e*), 9(*f*) and 9(*h*). The square wave shown at FIG. 9(*d*) represents the waveform obtained by differentiating the output of the FM discriminator 79. This signal is utilized in the time gate generator 81 as a reference for the phase locked oscillator running at the fourth harmonic $4F_M$. The phase locked oscillator waveform is shown at FIG. 9(*e*). This square wave is in turn applied to the count down timing chain to furnish the square wave shown in FIG. 9(*f*) at frequency $2F_M$ and the square wave shown in FIG. 9(*h*) at $F_M$.

The square wave signals depicted in FIGS. 9(*f*) and 9(*h*) are applied to the gate inputs of phase detectors 82 and 83, respectively. These signals operate in the phase detectors 82, 83 in a manner such that the east-west (E-W) error signal shown in FIG. 9(*b*) is multiplied by the signals shown in 9(*f*) to produce the E-W error signal shown in FIG. 9(*g*). In the same manner, the N-S error signal depicted in FIG. 9(*c*) is multiplied in phase detector 83 by the gating signal shown in curve 9(*h*) to produce the N-S error signal shown in FIG. 9(*i*). The error signals of FIGS. 9(*g*) and 9(*i*) are passed through their respective low pass filters 84 and 85, which filter out the ripple components thereof, to produce the dc error signals required to control pointing, of the antenna in two axes.

As seen in FIG. 1, the E-W error signal is applied to the de-spin motor control, along with a commandable offset bias, if any, to aim the antenna in the proper east-west direction. The N-S error signal is applied to a motor-controlled north-south antenna gimbal drive on the antenna reflector 12 to aim the antenna. Alternatively, the N-S error signal may be used to tilt the spin axis of the satellite using the attitude jet or jets with sufficient accuracy to achieve precision north-south pointing.

Thus, there has been described a two-axis antenna direction control system which provides high precision beam pointing at a low cost in weight, complexity and money compared with alternative approaches which employ error sensors not integrated into the communication or the command receiver. Static calibration errors, and errors associated with thermal deformation of the antenna reflector, are eliminated, since these errors are tracked out. The communication antenna aperture is larger than a separate sensing antenna meeting low system weight constraints could be, thus providing greater sensitivity to the beacon. The narrow beam of the large antenna also enhances the accuracy, and angle noise less than 0.001 degree can be achieved with practical parameters. An overall beam pointing accuracy of 0.01 degree in both axes may be achieved with this system. The particular modulation of the ground beacon results in a low spectral power density, which is also desirable.

By locating the system complexities at the ground station rather than in the satellite, many potential sources of satellite failure are eliminated. The apparatus on board the satellite is further simplified by processing the error signals in the command receiver which must be provided on the satellite anyway for other purposes.

It is to be understood that the above-described embodiment of the invention is merely illustrative of the many possible specific embodiments which represent applications of the principles of the present invention. Numerous and varied other arrangements can be readily devised in accordance with these principles by those skilled in the art without departing from the spirit and scope of the invention.

I claim:

1. In a communication system, an arrangement for producing an antenna pointing error signal, comprising:

a two-dimensional antenna assembly having feed horns and a reflector for receiving a radiated frequency modulated signal from a remote signal source;

means connected to said antenna feed horns for producing a sum signal and two orthogonally related difference signals;

means for combining said difference signals in phase quadrature relationship; and circuit means including a directional filter having a flat amplitude response and linear phase shift over the frequency range of frequency modulation for combining said sum signal with said combined difference signals thereby to produce an antenna pointing error signal.

2. In a communication system, an arrangement for producing an antenna pointing error signal, comprising:

an antenna assembly including a reflector for receiving a beacon signal which periodically deviates in frequency from the low end to the high end of its frequency band and back;

a plurality of antenna feed horns disposed at the focal plane of said reflector;

a biconjugate hybrid junction network coupled to said antenna feed horns to provide a sum signal, a N-S pointing error signal and an E-W pointing error signal;

a phase quadrature hybrid junction network coupled to said biconjugate hybrid junction network for combining said pointing error signals in phase quadrature relationship; and circuit means coupled to said biconjugate hybrid junction network and to said phase quadrature hybrid junction network and including a directional tracking filter for combining said sum signal with said combined pointing error signals, said directional tracking filter being tuned to the frequency band of said beacon signal and having a flat amplitude response and a linear phase response over the frequency band of said beacon signal with a phase difference of 360° between the low and high frequency extremes of said beacon signal to thereby produce an amplitude modulated antenna pointing error signal containing the combined N-S and E-W antenna pointing error information.

3. In a communication system, an arrangement for producing an antenna pointing error signal, comprising:

a directional antenna having a reflector and four antenna horns disposed in a rectangular group in the focal plane of said reflector for receiving a radiated frequency modulated signal from a remote signal source;

means supporting said antenna to move angularly in first and second orthogonally related planes;

means connecting all of said feed horns to produce a sum signal, to produce a difference signal when said antenna is pointed away from said signal source in said first plane and to produce a further difference signal when said antenna is pointed away from said signal source in said second plane;

means receiving said difference signals for combining said difference signals in phase quadrature relationship; and circuit means including a directional filter having a flat amplitude response and a linear 360° phase shift over the frequency range of said frequency modulation for combining said sum signal with said combined difference signals to thereby produce an antenna pointing error signal.

4. A two-axis antenna direction control system comprising:

an antenna reflector for receiving a beacon signal which periodically deviates in frequency from the low end to the high end of its frequency band and back;

a plurality of antenna feed horns disposed at the focal plane of said antenna reflector;

a biconjugate hybrid junction network coupled to said antenna feed horns to provide a sum signal, a N-S error signal, and an E-W error signal;

a phase quadrature hybrid junction network coupled to said biconjugate hybrid junction network for combining said N-S error signal and said E-W error signal in phase quadrature to produce a combined error signal;

circuit means coupled to said biconjugate hybrid junction network and to said phase quadrature hybrid junction network and including a directional tracking filter, for coupling said sum signal over to and combining it with said combined error signal, said directional tracking filter being tuned to the frequency band of said beacon signal, said directional tracking filter having a flat amplitude response and a linear phase response over the frequency band between the low and high frequency extremes of said beacon signal, said directional tracking filter having a relative phase difference of 360° between the low and high frequency extremes of said beacon signal, as the frequency of said beacon signal is deviated from the low end to the high end of its band and back, the phase of said sum signal is shifted through 360° and back, causing said combined error signal to become amplitude modulated with the modulation envelope of the amplitude modulation containing the combined N-S and E-W error information, said combined error signal thereby containing amplitude and frequency modulation signal components;

an AM detector coupled to said circuit means for recovering the modulation signal component of said combined error signal to produce a demodulated AM signal;

an FM discriminator coupled to said circuit means for recovering the frequency modulated signal component from said combined error signal;

a time gate generator circuit coupled to said discriminator for developing two gating signals, one at the rate of the frequency modulated signal, and the other at twice the rate of the frequency modulated signal;

a pair of phase detectors each coupled to said AM detector and to said time gate generator circuit, one of said phase detectors detecting the demodulated AM signal with the gating signal having the rate of the frequency modulated signal to provide a DC N-S error signal, the other of said phase detectors detecting the demodulated AM signal with the gating signal having the rate of twice the frequency modulated signal to provide a DC E-W error signal; and individual means, one responsive to said DC N-S error signal and one responsive to said DC E-W error signal for controlling angular movements of said antenna assembly about said two axes.

5. Apparatus as set forth in claim 2 in which said circuit means further includes a phase quadrature hybrid junction network having individual input arms coupled to said first named phase quadrature hybrid junction network and to said directional tracking filter, respectively, for producing said amplitude modulated antenna pointing error signal containing the combined N-S and E-W antenna pointing error information.

6. Apparatus as set forth in claim 4 in which said circuit means further includes a phase quadrature hybrid junction network having individual input arms coupled to said directional tracking filter and to said first named phase quadrature hybrid junction network, respectively, for producing said combined error signal having amplitude and frequency modulated signal components.

* * * * *